United States Patent
Minami et al.

(10) Patent No.: US 10,501,643 B2
(45) Date of Patent: Dec. 10, 2019

(54) AEROSOL PAINT COMPOSITION AND METALLIC MECHANICAL PART COATED WITH SAME

(71) Applicants: NHK SPRING CO., LTD., Kanagawa (JP); NHK SPRING PRODUCTION COMPANY, Kanagawa (JP)

(72) Inventors: Kenji Minami, Kanagawa (JP); Yasutaka Furuta, Kanagawa (JP); Yuki Ogami, Tochigi (JP)

(73) Assignee: NHK SPRING CO., LTD., Kanagawa (JP)

( * ) Notice: Subject to any disclaimer, the term of this patent is extended or adjusted under 35 U.S.C. 154(b) by 191 days.

(21) Appl. No.: 15/532,490

(22) PCT Filed: Dec. 2, 2015

(86) PCT No.: PCT/JP2015/083850
§ 371 (c)(1),
(2) Date: Jun. 1, 2017

(87) PCT Pub. No.: WO2016/088789
PCT Pub. Date: Jun. 9, 2016

(65) Prior Publication Data
US 2017/0321063 A1  Nov. 9, 2017

(30) Foreign Application Priority Data
Dec. 2, 2014 (JP) .................. 2014-244517

(51) Int. Cl.
| | |
|---|---|
| C09D 5/02 | (2006.01) |
| C09D 5/08 | (2006.01) |
| B05D 7/24 | (2006.01) |
| B05D 1/02 | (2006.01) |
| C09D 167/08 | (2006.01) |
| C09D 7/61 | (2018.01) |
| C09D 7/40 | (2018.01) |
| C08L 51/08 | (2006.01) |
| C09D 151/08 | (2006.01) |

(52) U.S. Cl.
CPC .................. *C09D 5/08* (2013.01); *B05D 1/02* (2013.01); *B05D 7/24* (2013.01); *C08L 51/08* (2013.01); *C09D 5/021* (2013.01); *C09D 7/61* (2018.01); *C09D 7/69* (2018.01); *C09D 151/08* (2013.01); *C09D 167/08* (2013.01); *C09D 7/40* (2018.01)

(58) Field of Classification Search
CPC ....... C08L 51/08; C08L 67/08; C09D 151/08; C09D 167/08; C09D 5/021; C08F 283/01
See application file for complete search history.

(56) References Cited

U.S. PATENT DOCUMENTS

| | | | | |
|---|---|---|---|---|
| 2004/0127605 | A1* | 7/2004 | Redding | ............... C08F 290/06 523/500 |
| 2008/0008678 | A1 | 1/2008 | Wyers | |

FOREIGN PATENT DOCUMENTS

| | | |
|---|---|---|
| CN | 103642361 | 3/2014 |
| EP | 0491101 | 12/1990 |
| JP | H0317164 | 1/1991 |
| JP | 2002294140 | 10/2002 |
| JP | 2009-197202 | 9/2009 |

OTHER PUBLICATIONS

Publication data for Surface Coatings, vol. 1: Raw Materials and their Usage (1993) Springer Science + Business Media.*
Chapter 29: entitled Extender Pigments from Surface Coatings, vol. 1: Raw Materials and their Usage (1993) Springer Science + Business Media.*
Corresponding Chinese office action dated Sep. 28, 2018 for Application No. CN 201580065779.8 (Chinese only).
Corresponding Korean office action dated Sep. 17, 2018 for Application No. KR 10-2017-7015168 (with English translation).

* cited by examiner

*Primary Examiner* — Marc S Zimmer
(74) *Attorney, Agent, or Firm* — Martin & Ferraro, LLP

(57) ABSTRACT

Provided are an aerosol coating composition excellent in a matte effect and capable of preventing co-rotation from occurring. The aerosol coating composition contains a modified alkyd resin, inorganic microparticles and an organic solvent. Herein, the modified alkyd resin is a non-aqueous dispersion resin which is a copolymer of a vinyl based monomer and an alkyd resin. The inorganic microparticles are made of one selected from silica, titanium oxide, zinc oxide, alumina, calcium carbonate, talc and clay or the like. The inorganic microparticles have a mean particle diameter of 1.0 to 10.0 μm, and a content of 0.1 to 5 mass %. There is also provided a metallic mechanical part coated with the aerosol coating composition.

7 Claims, 1 Drawing Sheet

AEROSOL PAINT COMPOSITION AND METALLIC MECHANICAL PART COATED WITH SAME

This is a National Phase Application under 35 USC 371 of PCT/JP2015/083850 filed Dec. 2, 2015 (published on Jun. 9, 2016 as WO 2016/088789); which claims priority to Japanese Application No. 2014-244517 filed Dec. 2, 2014; all of which are incorporated by reference herein in their entirety.

FIELD OF INVENTION

The present invention relates to an aerosol coating composition and a metallic mechanical part coated with the aerosol coating composition.

BACKGROUND ART

Various rust-preventive and anti-corrosive coatings are applied for the purpose of rust-prevention and anti-corrosion to various steel products used in a vehicle, an electric appliance, and an industrial machine and the like. Depending on a mechanical part, a matte type coating with less glossiness is preferably used as a coating material applied to a surface of the mechanical part.

Various matting agents are added to such matte type coatings so as to roughen a surface of a dried coating and reduce glossiness thereof. Conventionally, resin based microparticles are used as a matting agent added to a matte type coating material (Patent Document 1). A resin of the resin based microparticles includes, for example, an acryl resin, a polyolefin resin, a polyester resin, a polyamide resin or the like. A representative matting agent is polyethylene wax having a mean particle diameter of 0.5 to 100 μm.

DOCUMENTS OF PRIOR ART

Patent Documents

Patent Document 1: Japanese Unexamined Patent Application Publication No. 2009-197202

SUMMARY OF INVENTION

Problems to be Solved by Invention

However, when a matte type coating including polyethylene wax is applied to a mechanical part, and the mechanical part is fixed by a nut and a bolt, sliding occurs between the nut and bolt to cause a co-rotation phenomenon, resulting in the difficulty of fixing. Here, a co-rotation phenomenon is an event that occurs when a bolt and a nut are attached to a hole of a member to be wounded and fastened by a wrench etc., the bolt and the nut slip on the member to be fastened, and run idle. This makes the winding fastening difficult.

Wax such as polyethylene wax has an excellent matte effect for roughening a coating surface, while some types of wax have a lubricant effect. When such wax is used as a matting agent, a co-rotation phenomenon may occur when a member is fastened by a bolt and a nut.

The co-rotation may occur due to the following cause. That is, when a member is fastened by a bolt and a nut, wax particles in a coating on a surface of the member are pressed and crushed. This may form a lubricant coating, which may decrease frictional resistance to cause the co-rotation.

Further, when various types of metallic mechanical parts are coated for the purpose of rust-prevention and anti-corrosion at a manufacturing site of a vehicle or an electric appliance, it is preferable to use an aerosol type of a quick drying coating material from the viewpoint of the handling and simplicity properties. A suitability of a matting agent for coating applicable to an aerosol type coating is demanded to be checked in terms of the stability of storage and clogging of a nozzle.

The present invention has been developed in view of the above circumstances. An object of the present invention is to provide an aerosol coating composition excellent in a matte effect and capable of preventing co-rotation from occurring, and a metallic mechanical part coated with the aerosol coating composition.

Means for Solving Problems

The present inventors have keenly investigated the above aerosol coating composition and eventually found out that specific inorganic microparticles are usable as the coating composition, which is capable of preventing the co-rotation and acting as a matting agent. This results in the achievement of the present invention. Specifically, the present invention has the following aspects.

1. An aerosol coating composition of the present invention contains a modified alkyd resin, inorganic microparticles and an organic solvent. The modified alkyd resin is a non-aqueous dispersion resin which is a copolymer of a vinyl based monomer and an alkyd resin. The inorganic microparticles are made of any one selected from silica, titanium oxide, alumina, calcium carbonate, talk and clay. The inorganic microparticles have a mean particle diameter in the range from 1.0 μm to 10.0 μm, and a content in the range from 0.1 mass % to 5 mass %.

2. In an aerosol coating composition of the present invention, the alkyd resin is preferably prepared by esterifying at least one selected from a drying oil, a semi-drying oil, a drying fatty acid and a semi-drying fatty acid with a polyalcohol in the presence of a polybasic acid.

3. In an aerosol coating composition of the present invention, the inorganic microparticles are preferably made of silica.

4. In an aerosol coating composition of the present invention, the aerosol coating composition may further contain a propellant 5. A metallic mechanical part of the present invention is coated with the aerosol coating composition.

Effect of Invention

An aerosol coating composition of the present invention may be applied onto a metallic mechanical part, excellent in a matte effect, and prevent the co-rotation from occurring.

EMBODIMENTS FOR CARRYING OUT INVENTION

Figure 1A:
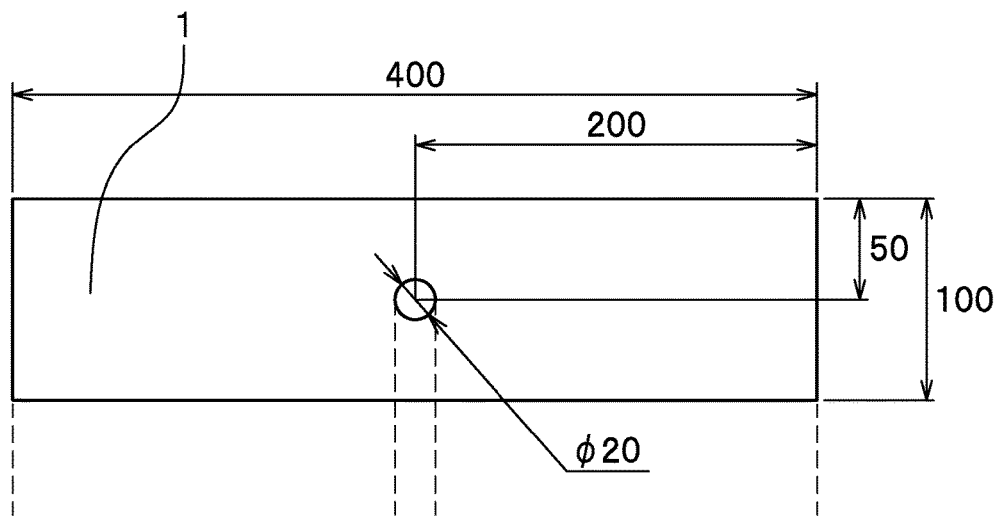
FIG. 1A is a dimensional drawing (i.e., plan view) of a steel product used for evaluating the co-rotation prevention.

Hereinafter, embodiments of the present invention will be described in detail. Note, the present invention is not limited to the following embodiments below, and those embodiments may be optionally modified without departing from the scope of the present invention.

An aerosol coating composition of the present invention is a coating composition used for an aerosol, containing a modified alkyd resin, inorganic microparticles and an organic solvent (hereinafter, appropriately referred to as "a coating composition").

Next, respective components included in the coating composition will be described more specifically.

Modified Alkyd Resin

A modified alkyd resin (e.g., non-aqueous dispersion resin, NAD resin) includes a dispersion stabilizer (B) which is soluble in an organic solvent (A), dispersion particles (D) made of a vinyl based polymer (C) which is insoluble in the organic solvent (A), and the organic solvent (A). Herein, a mass rate of the solid content of the dispersion stabilizer (B) to the dispersion particles (D) is represented by (B)/(D)=80/20 to 10/90, preferably, 70/30 to 15/85, more preferably 60/40 to 20/80. Further, the organic solvent (A) is the same as the organic solvent contained in the coating composition.

Here, the term of "the dispersion stabilizer (B) which is soluble in the organic solvent (A)" means that the dispersion stabilizer (B) does not cause any turbidity and segregation at 20° C. when the solid content of the dispersion stabilizer (B) is adjusted at 50 mass % in the organic solvent (A), and simultaneously has a viscosity of 300 P (poise) or less at 20° C.

Further, the term of "the vinyl based polymer (C) which is insoluble in the organic solvent (A)" means that the vinyl based polymer (C) does cause turbidity and segregation at 20° C. when the solid content of the vinyl based polymer (C) is adjusted at 50 mass % in the organic solvent (A), and simultaneously has a viscosity of 300 P (poise) or more at 20° C.

Organic Solvent (A)

The following solvents may be used as the organic solvent (A)

(1) Various types of aliphatic based hydrocarbon solvents including, for example, n-hexane, n-heptane, cyclohexane, methylcyclohexane, ethylcyclohexane or the like.

(2) Various types of aliphatic based hydrocarbon solvents or a mixture of aliphatic and aromatic based hydrocarbon solvents including, for example, "LAWS, HAWS" (products of Royal Dutch Shell in the Netherlands); "Shellsol 70, Shellsol 71, ShellsolD40" (products of Royal Dutch Shell in the Netherlands); "IP Solvent 1016, IP Solvent 1620 (products of Idemitsu Petrochemical); "A solvent, K solvent, LA solvent" (products of Nippon Oil Co.); "Exxon Naphtha No. 3, Exxon Naphtha No. 5, Exxon Naphtha No. 6 (products of Exxon Chemical in the USA); "EXXSOL D30, EXXSOL D40, EXXSOL D60, EXXSOL D70 (products of Exxon Chemical in the USA); "Isopar E, Isopar G, Isopar H (products of Exxon Chemical in the USA) or the like.

(3) Various types of aromatic based hydrocarbon solvents including, for example, toluene, xylene, "Solvesso 100 (product of Exxon Chemical in the USA).

(4) Various types of ester based solvents including, for example, ethyl acetate, n-butyl acetate, isobutyl acetate, amyl acetate or the like.

(5) Various types of ketone based solvents including, for example, methyl ethyl ketone, methyl isobutyl ketone, methyl amyl ketone, cyclohexanone or the like.

(6) Various types of alcohol based solvents including, for example, isopropyl alcohol, 1-butanol, isobutanol or the like.

(7) Various types of esters each containing an alkoxy group including, for example, ethylene glycol monomethylether acetate, ethylene glycol monoethylether acetate, ethylene glycol mono-n-butylether acetate, ethylethoxy propionate or the like.

Note, the above organic solvents (A) may be used alone or in combination of 2 or more types. Further, if the organic solvent (A) is volatile at room temperature, a coating composition excellent in quick drying may be provided.

Dispersion Stabilizer (B)

The dispersion stabilizer (B) has a function for stably keeping the dispersion state of the dispersion particles (D) made of a vinyl based polymer (C) which is insoluble in the organic solvent (A). The dispersion stabilizer (B) is made of a vinyl based polymer (E) which is soluble in the organic solvent (A) and/or an alkyd resin (F) which is soluble in the organic solvent (A), as described hereinafter.

Vinyl Based Monomer (E) Soluble in Organic Solvent (A)

The vinyl based polymer (E) which is soluble in the organic solvent (A) is prepared by using a vinyl based monomer described later and other polymerizable compound where necessary, and performing a commonly known and conventional polymerization reaction such as a solution polymerization in the presence of a radical polymerization initiator Vinyl Based Monomer The followings described below may be used as a vinyl based monomer.

(1) Various types of alkyl (meth)acrylates including, for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, octyl (meth)acrylate, 2-ethylhexyl (meth)acrylate, lauryl (meth)acrylate, "Acryester SL" (product of Mitsubishi Rayon Co., Ltd.), stearyl (meth)acrylate or the like.

(2) Various types of cycloalkyl (meth)acrylates including, for example, cyclohexyl (meth)acrylate, 4-tert-butylcyclohexyl (meth)acrylate, isobornyl (meth)acrylate or the like.

(3) Various types of w-alkoxyalkyl (meth)acrylates including, for example, 2-methoxyethyl (meth)acrylate, 4-methoxybutyl (meth)acrylate or the like.

(4) Various types of alkyl (meth)acrylates each containing an aromatic group including, for example, benzyl (meth)acrylate, 2-phenylethyl (meth)acrylate or the like.

(5) Various types of vinyl based monomers each containing an aromatic group including, for example, styrene, α-methylstyrene, p-tert-butylstyrene, vinyltoluene or the like.

(6) Various types of carboxylic acid vinyl esters including, for example, vinyl acetate, vinyl propionate, vinyl benzoate, "VeoVA" (product of Royal Dutch Schell in Netherland) or the like.

(7) Various types of halogenated olefins including, for example, vinyl chloride, vinylidene chloride, vinyl fluoride, vinylidene fluoride or the like.

(8) Various fluorine-containing vinyl based monomers including, for example, "Viscoat 3F, Viscoat 3FM, Viscoat 8FM, Viscoat 17FM" (fluorine-containing alkyl (meth)acrylates of Osaka Organic Chemical Industry Ltd.), perfluorocyclohexyl (meth)acrylate, diperfluorocyclohexyl fumarate or the like.

(9) Various types of unsaturated dibasic acid dialkyl esters including, for example, dimethyl maleate, di-n-butyl maleate, dimethyl fumarate, dimethyl itaconate or the like.

(10) Various types of α-olefins including, for example, ethylene, propylene, isobutylene, 1-butene or the like.

(11) Various types of alkyl vinyl ethers including, for example, ethyl vinyl ether, n-propyl vinyl ether, n-butyl vinyl ether, isobutyl vinyl ether, cyclohexyl vinyl ether or the like.

(12) Various types of cyano group-containing vinyl based monomers including, for example, (meth)acrylonitrile or the like.

(13) Various types of hydroxyl group-containing alkyl (meth)acrylates including, for example, 2-hydroxyethyl (meth)acrylate, 2-hydroxypropyl (meth)acrylate, 2-hydroxybutyl (meth)acrylate, 4-hydroxybutyl (meth)acrylate, 4-hydroxymethylcyclohexyl-methyl (meth)acrylate or the like.

(14) Various types of addition reaction products between hydroxyl group-containing vinyl based monomer such as the above described hydroxyl group-containing alkyl (meth)acrylates and lactones such as e-caprolactone including, for example, "Placcel FA-1, Placcel FA-2, Placcel FM-1, Placcel FM-2" (caprolactone adduct monomers of Daicel Co.) or the like, which are various types of hydroxyl group-containing (meth)acrylates.

(15) Various types of hydroxyl group-containing compounds formed by the reaction of a carboxyl group of unsaturated monocarboxylic acid or unsaturated dicarboxylic acid such as (meth) acrylic acid, maleic acid, fumaric acid, and itaconic acid with a glycidyl group of monoepoxy compounds such as ""Cardura E" (fatty acid glycidyl ester of Royal Dutch Shell in Netherland).

(16) Various types of unsaturated carboxylic acids including, for example, (meth)acrylic acid, maleic acid, fumaric acid, itaconic acid, crotonic acid or the like.

(17) Various types of monoesters (half esters) formed by the reaction of a carboxyl group of the above described unsaturated dicarboxylic acids such as monomethyl itaconate, monomethyl maleate, mono-n-butyl maleate with a hydroxy group of saturated monohydric alcohols.

(18) Various types of saturated dicarboxylic acid monovinyl esters including, for example, adipic acid mono vinyl, succinic acid monovinyl or the like.

(19) Various types of addition reaction products between saturated polycarboxylic acid anhydrides such as succinic anhydride, glutaric anhydride, phthalic anhydride, trimellitic anhydride with hydroxyl group-containing vinyl based monomers such as 2-hydroxyethyl (meth)acrylate.

(20) Various types of addition reaction products formed by the reaction of the above carboxyl group-containing monomers (monoesters of unsaturated carboxylic acids and unsaturated dicarboxylic acids with saturated monohydric alcohol, monovinyl esters of saturated dicarboxylic acids, addition reaction products of saturated polycarboxylic acid anhydride with hydroxyl group-containing vinyl based monomers) with lactones such as ε-caprolactone.

(21) Various types of unsaturated polycarboxylic acid anhydrides such as maleic anhydride, itaconic anhydride.

(22) Various types of unsaturated monocarboxylic acids such as acrylate anhydride, methacrylate anhydride.

(23) Various types of mixed acid anhydrides formed by unsaturated carboxylic acids such as (meth)acrylic acid with saturated carboxylic acids such as benzoic acid.

(24) Various types of isocyanate group-containing vinyl based monomers such as 2-isocyanateethyl (meth)acrylate.

(25) Various types of glycidyl group-containing vinyl based monomers including, for example, glycidyl (meth) acrylate, methylglycidyl (meth)acrylate, glycidyl vinyl ether, acryl glycidyl ether, 3,4-epoxycyclohexylmethyl (meth)acrylate or the like.

(26) Various types of hydrolyzable silyl group-containing (meth)acrylates including, for example, 3-(meth)acryloyloxypropyl-trimethoxysilane, 3-(meth)acryloyloxypropyltriethoxysilane, 3-(meth)acryloyloxypropylmethyldimethoxysilane or the like.

(27) Various types of hydrolyzable silyl group-containing (meth)acrylates including, for example, vinyltrimethoxysilane, vinyltriethoxysilane, vinylmethyldimethoxysilane, allyltrimethoxy-silane or the like.

(28) Various types of (meth)acryloyloxy alkyl acid phosphates such as 2-(meth)acryloyloxy ethyl acid phosphate.

(29) Various types of diphenyl (meth)acryloyloxy alkyl phosphates such as diphenyl-2-(meth)acryloyloxy ethyl phosphate.

(30) Dialkyl (meth)acryloyloxy alkyl phosphates.

(31) Various types of tertiary amino group-containing alkyl (meth)acrylates including, for example, 2-dimethylaminoethyl (meth)acrylate, 2-dimethylaminoethyl (meth)acrylate, 2-di-n-propylaminoethyl (meth)acrylate, 3-dimethylaminopropyl (meth)acrylate, 4-dimethylaminobutyl (meth)acrylate or the like.

(32) Various types of tertiary amino group-containing vinyl ethers including, for example, 2-dimethylaminoethyl vinyl ether, 3-dimethylaminopropyl vinyl ether, 4-dimethylaminobutyl vinyl ether or the like.

(33) Various types of (meth)acrylamides including, for example, (meth)acrylamides, N-methyl (meth)acrylamide, N-n-butyl (meth)acrylamide, N-n-butoxymethyl (meth) acrylamide, N,N-dimethyl (meth)acrylamide, diacetone acrylamide or the like.

(34) Various types of tertiary amino group-containing (meth)acrylamides including, for example, N-[2-(dimethylamino)ethyl] (meth)acrylamide, N-[2-(diethylamino)ethyl] (meth)acrylamide, N-[3-(dimethylamino)propyl] (meth) acrylamide, N-[4-(dimethylamino)butyl] (meth)acrylamide or the like.

Other Polymerizable Compounds

For the purpose of improving a weather resistance among the coating properties, various types of polymerizable photostabilizers may be used, including benzotriazole based acrylic monomers such as "RUVA-93" (product of Otsuka Chemical Co., Ltd.) and hindered amine based acrylic monomers such as "ADK STAB LA-82, ADK STAB LA-87" (products of ADECA Co.)

Further, a variety of high molecular weight monomers (i.e., macromolecular monomers) having a copolymerizable terminal functional group may be also used, including "AA-6, AS-6, AN-6, AB-6, AA-714S" (products of TOAGOSEI CO., LTD.)

Moreover, a polymerizable unsaturated group-containing resin may be used where necessary, for example, including vinyl based polymers, polyester resins, alkyd resins, petroleum based resins, rosin esters, polyetherpolyols, all of which have a polymerizable unsaturated group. Those polymerizable unsaturated group-containing resins may be used alone or in combination of 2 or more types.

The above described vinyl based monomers and/or polymerizable compounds may be used alone or in combination of 2 or more types.

Radical Polymerization Initiator

A radical polymerization initiator may be used including, for example, azo-compounds such as 2,2'-azobisisobutyronitrile, 2,2'-azobis(2-methylbutironitrile or the like); various types of peroxides such as benzoyl peroxide, tert-butylperoxy-2-ethylhexanoate, tert-butylperoxy acetate, tert-butylperoxy benzoate, tert-butylcumyl peroxide, di-tert-butyl peroxide, cumene hydroperoxide, tert-butyl hydroperoxide, 1,1-bis(tert-butylperoxy)cyclohexane, tert-amylperoxy neodecanoate, tert-amylperoxy-2-ethylhexanoate, tert-amylperoxy-n-octoate, tert-amylperoxyisononanoate, tert-amylperoxybenzoate, di-tert-amyl peroxide or the like. Those radical polymerization initiators may be used alone or in combination of 2 or more types.

Further, various types of chain transfer agents may be used as a molecular weight regulator where necessary, including lauryl mercaptan, octyl mercaptan, 2-mercaptoethanol, octyl thioglycolate, 3-mercaptopropionic acid or the like.

Alkyd Resin (F) Soluble in Organic Solvent (A)

An alkyd resin (F) which is soluble in an organic solvent (A) may be obtained via esterifying at least one selected from a drying oil, a semi-drying oil, a drying fatty acid and a semi-drying fatty acid with a polyalcohol in the presence of a polybasic acid.

Drying Oil, Semi-Drying Oil, Drying Fatty Acid and Semi-Drying Fatty Acid

A drying oil, a semi-drying oil, a drying fatty acid and a semi-drying fatty acid may include, for example, various types of unsaturated fatty acids such as oleic acid, linoleic acid, linolenic acid, eleostearic acid, ricinoleic acid; "Pamorin 200, Pamorin 300" (synthetic drying fatty acids of Hercules Incorporated in the US); various types of drying oils or semi-drying oils such as a linseed oil, a tung oil, a dehydrated castor oil, a tall oil, a soybean oil, an olive oil, a safflower oil, a rice bran oil; and various types of fatty acids of the above drying oils and semi-drying oils. Those drying oils, semi-drying oils, drying fatty acids and semi-drying fatty acids may be used alone or in combination of 2 or more types.

Further, various types of non-drying oils such as a hydrogenated coconut oil, a coconut oil, and various types of fatty acids of the non-drying oils may be used in combination, without departing from the scope of the present invention and deteriorating the effect of the present invention.

Polybasic Acid

The following acids may be used as a polybasic acid, for example.

(1) Various types of aromatic dicarboxylic acids or aromatic dicarboxylic acid anhydrides including, for example, phthalic acid, phthalic acid anhydride, isophthalic acid, terephthalic acid, methyl terephthalate, trimellitic acid, trimellitic acid anhydride, pyromellitic acid, pyromellitic acid anhydride or the like.

(2) Various types of alicyclic dicarboxylic acids and alicyclic dicarboxylic acid anhydrides including, for example, hexahydrophthalic acid, hexahydrophthalic acid anhydride, tetrahydrophthalic acid, tetrahydrophthalic acid anhydride, methylhexahydrophthalic acid, methylhexahydrophthalic acid anhydride or the like.

(3) Various types of aliphatic dicarboxylic acids or aliphatic dicarboxylic acid anhydrides including, for example, succinic acid, succinic acid anhydride, maleic acid, maleic acid anhydride, fumaric acid, adipic acid, azelaic acid, sebacic acid or the like.

(4) Benzoic acid, p-tert-butyl benzoate, versatic acid or the like.

Note, those polybasic acids may be used alone or in combination of 2 or more types.

Polyalcohol

A polyalcohol may include, for example, ethylene glycol, propylene glycol, 1,3-butylene glycol, 1,6-hexanediol, diethylene glycol, dipropylene glycol, neopentyl glycol, triethylene glycol, cyclohexanedimethanol, hydrogenated bisphenol A, glycerin, trimethylolethane, trimethylolpropane, pentaerythritol or the like. Those polyalcohols may be used alone or in combination of 2 or more types.

Further, various types of monoepoxy compounds such as "Cardura E" may be used similarly to the above described polyalcohols which react with the polybasic acids.

Further, a catalyst may be used where necessary. A usable catalyst includes, for example, dibutyltin oxide, monobutyltin-2-ethylhexanoate, dibutyltin dilaurate, tin acetate, zinc acetate, lead naphthenate, tetrabutyl titanate, tetraisopropyl titanate, sodium hydroxide, potassium hydroxide, sodium acetate, lithium acetate, lithium hydroxide or the like. The above catalysts may be used alone or in combination of 2 or more types.

The above described vinyl based polymer (E) soluble in the organic solvent (A) and/or the alkyd resin (F) soluble in the organic solvent (A) may be used alone or in combination of 2 or more types.

Examples of a preferable vinyl based polymer (E) include, for example, (meth)acrylic acid alkyl copolymer, (meth)acrylic acid alkyl-styrene copolymer, (meth)acrylic acid-(meth)acrylic acid alkyl copolymer, (meth)acrylic acid-(meth)acrylic acid alkyl-styrene copolymer, (meth)acrylic acid alkyl-(meth)acrylic acid-hydroxyalkyl copolymer, (meth)acrylic acid alkyl-(meth)acrylic acid hydroxyalkyl-styrene copolymer, acrylonitrile-(meth)acrylic acid alkyl copolymer, acrylonitrile-(meth)acrylic acid alkyl-styrene copolymer or the like.

Further, examples of a preferable alkyd resin include, for example, animal fat and oil or the fatty acid alkyl (C=0 to 4) benzenepoly (n=1 to 4) carboxylic acid alkyl or alkenyl (each C=1 to 40) poly (n=1 to 6) alcohol polycondensate; alkyl or alkenyl (each C=1 to 21, 34) poly (n=1 to 2) carboxylic acid alkyl (C=0 to 4) benzenepoly (n=1 to 4) carboxylic acid alkyl or alkenyl (each C=1 to 40) poly (n=1 to 6) alcohol polycondensate; alkyl (C=0 to 4) benzenepoly (n=1 to 4) carboxylic acid alkyl or alkenyl (each C=1 to 40) poly (n=1 to 6) alcohol bisphenol A β-alkyl (C=0 to 1) epichlorohydrin epoxy resin polycondensate.

Vinyl Based Polymer (C) Insoluble in Organic Solvent (A)

A vinyl based polymer (C) which is insoluble in the organic solvent (A) may be obtained via using the above described vinyl based monomers and other polymerizable compounds where necessary, and performing a conventionally well known polymerization reaction such as solution polymerization in the presence of a radical polymerization initiator.

Here, the organic solvent used in the solution polymerization may include, for example, aliphatic hydrocarbon such as a mineral spirit; aromatic hydrocarbon such as toluene, xylene; esters such as ethyl acetate, butyl acetate; ketones such as methyl isobutyl ketone, cyclohexanone; ether alcohols such as ethylene glycol monomethyl ether, diethylene glycol monomethyl ether; ether esters such as ethylene glycol monomethyl ether acetate; chlorine types such as 1,1,1-trichloroethane; and nitrogen-containing type such as dimethylformamide, N-methylpyrrolidone or the like.

Dispersion Particles (D)

Dispersion particles (D) made of a vinyl based polymer (C) insoluble in an organic solvent (A) are made of the above described vinyl based polymers (C) insoluble in the organic solvents (A). As mentioned above, the particles may be obtained via performing a conventionally well known polymerization reaction such as solution polymerization in the presence of the radical polymerization initiator. The dispersion particles (D) have a mean particle diameter ranging from several tens nm to several μm.

A modified alkyd resin is prepared via including the above described dispersion stabilizer (B), the dispersion particles (D) made of the vinyl based polymer (C) and the organic solvent (A). A composition rate of the solid resin to the organic solvent (A) in the modified alkyd resin is represented by preferably resin solid/organic solvent (A)=30/70 to 80/20 (mass %), more preferably 45/55 to 65/35 (mass %), where the total amount is represented by 100 mass %.

Inorganic Microparticles

The coating composition of the present invention includes inorganic microparticles. The inorganic microparticles contained in the coating roughen a surface of the coating to afford a matte effect thereon. Preferably, the inorganic microparticles are stably and uniformly dispersed in the coating composition. The inorganic microparticles include silica (silicon oxide), titanium oxide, zinc oxide, alumina (aluminum oxide), calcium carbonate, talc, and clay or the like. Among those materials, silica is preferable in view of a particle diameter, a sedimentation property and availability. Further, multiple types of inorganic microparticles may be used in combination.

The usable mean particle diameter (i.e., mean primary particle diameter) of the inorganic microparticles is in the range from 1.0 μm to 10.0 μm, preferably 1.5 μm to 5.0 μm. When the mean particle diameter is less than 1.0 μm, it is difficult to obtain a matte effect, while when it is more than 10.0 μm, defects like nozzle clogging tend to occur during the spray coating.

Synthetic amorphous silica is preferable as a type of silica of the suitable inorganic microparticles. A method for preparing synthetic amorphous silica includes a dry process and a wet process. Both processes do not have specific limitations. However, a sedimentation method of wet processes is preferable from the viewpoint of the storage stability.

Here, it is preferable to more improve dispersion stability of the inorganic microparticles to the organic solvent so as to avoid sedimentation of the inorganic microparticles inside a spray-can during storage. Thus, surfaces of the inorganic microparticles may be subjected to a functionalization treatment. Similarly, a dispersion agent or a chelate agent used for inorganic microparticles may be added thereto.

Other Components

As other components, coloring agents such as a pigment and various types of additives may be added to the coating composition of the present invention, where necessary.

Representative examples of a pigment include, for example, color pigments such as titanium oxide, chrome yellow, phthalocyanine blue, phthalocyanine green, carbon black, mica, quinacridone red; and extender pigments such as kaolin, talc, diatomaceous earth, calcium carbonate or the like.

Further, as additives, a hardening accelerator, a deforming agent, a surface conditioner, a sedimentation preventing agent, a thickener, a dispersing agent or the like may be used. However, the present invention is not limited to those additives.

Aerosol Coating Composition

The coating composition of the present invention contains the above described modified alkyd resin, the inorganic microparticles and the organic solvent. A content of each component may be appropriately adjusted depending on a viscosity of a solution of each component. A preferable composition rate of the modified alkyd resin, the inorganic microparticles and the organic solvent is represented by: Modified Alkyd Resin/Inorganic Microparticles/Organic Solvent=1 to 35/0.1 to 5/30 to 80 (mass %), more preferably, 5 to 25/0.3 to 4/40 to 70 (mass %), when the total amount of the coating composition is defined as 100 mass %.

An addition amount of the inorganic microparticles is preferably 0.1 to 5 mass % against 100 mass % of the coating composition, more preferably, 0.3 to 4 mass %. When the addition amount is less than 0.1 mass %, it is difficult to achieve a matte effect. In contrast, when the addition amount is more than 5 mass %, the storage stability of the contents in a spray-can tends to be hardly achieved.

Further, a solvent for a spray-can (i.e., propellant) may be further added to the above described coating composition in order to use the coating composition of the present invention for a spray-can.

Dimethyl ether (DME) and liquid petroleum gas (LPG) etc. may be used as s solvent for spraying the coating composition (i.e., propellant) filled in a spray-can. Herein, DME and LPG may be used in combination. Those propellants are selected from one having good miscibility with the coating composition. In the present invention, dimethyl ether (DME) is desirable due to the excellent miscibility with the coating composition.

A composition rate of the coating composition to the propellant is represented by preferably: Coating Composition/Propellant=30/70 to 60/40 vol %, more preferably 45/55 to 50/55 vol %. When the rate of the coating composition is more than 60 vol %, splaying cannot be performed to the end and a part of the coating composition is remained. On the contrary, when the composition rate of the propellant is more than 70 vol %, a deposition rate onto a surface to be coated decreases, and therefore, a coating thickness may not be secured.

A viscosity of the coating composition for a spray-can is represented by the flow time preferably of 12 sec to 35 sec, more preferably 15 sec to 25 sec, when measured at 20° C. by Ford cup No. 4 in conformity to ASTM D1200. When the measured time is more than 35 sec, it is difficult to perform uniform atomization, resulting in poor finish. On the contrary, when the measured time is less than 12 sec, a coating thus sprayed causes drips and thin coatings. Thereby, a thickness of the coating may not be secured.

The spray-can preferably has an inside pressure ranging from 0.5 to 0.5 Mpa. When the inside pressure is less than 0.3 Mpa, the injection becomes weak, preventing normal atomization. On the contrary, when the inside pressure is more than 0.5 Mpa, the spray-can may be deformed or cause explosion. Further, too strong discharge pressure may decrease the coating efficiency onto the material to be coated.

The aerosol coating composition of the present invention may be manufactured by using an appropriate known method. When a metallic mechanical part is coated with the aerosol coating composition of the present invention, it is possible to provide a metallic mechanical part having a coating excellent in a matte effect and it is hard to cause co-rotation. Further, the coating formed by the aerosol coating composition of the present typically has a degree of thickness ranging 5 to 50 μm.

EXAMPLES

Hereinafter, Examples by which the effect of the present invention is confirmed will be described in detail. However, the present invention is not limited to those Examples.

Examples 1 to 3, Comparative Examples 1 to 2

(1) Preparation of Dispersion Stabilizer
(a) Synthesis of Alkyd Resin

To a reaction vessel equipped with a stirrer, a thermometer, a condenser, a water separator and a nitrogen gas inlet, added were soybean oil fatty acid (350 parts by mass), pentaerythritol (130 parts by mass), phthalic acid anhydride (160 parts by mass) and xylene (30 parts by mass), and the resulting mixture was heated at 240° C. under a nitrogen atmosphere to carry out the reaction. When an acid value per solid content reached 16, the heating was ended, and the reaction mixture was cooled. Then, the mixture was diluted with a mineral spirit (370 parts by mass) used as a solvent, thereby providing a resin solution (i) having a solid content of 60 mass %, a transparent pale brown color and a viscosity of 7 P (poise).

(b) Synthesis of Alkyd Modified Acrylic Resin

To a reaction vessel equipped with a stirrer, a thermometer, a condenser and a nitrogen gas inlet, added were the resin solution (i) (340 parts by mass) and the mineral spirit (50 parts by mass), and the reaction mixture was kept at 115° C. Then, a mixture beforehand prepared of styrene (50 parts by mass), isobutyl methacrylate (50 parts by mass), tert-butyl methacrylate (65 parts by mass), 2-ethylhexyl methacrylate (35 parts by mass) and benzoyl peroxide (5 parts by mass) was uniformly dropped into the reaction mixture of the resin solution (i) and the mineral spirit over 3 hrs, being kept at 115° C. under a nitrogen atmosphere.

After that, 2,2'-azobisisobutyronitrile (5 parts by mass) was further added, and the resulting mixture was kept at 115° C. for 1 hr. Then, the mineral spirit (220 parts by mass) was further added, thereby providing a resin solution (ii) having a solid content of 50 mass %, a transparent pale yellow color and a viscosity of 60 P (poise).

(2) Synthesis of Modified Alkyd Resin (a) Synthesis of Modified Alkyd Resin A

To a reaction vessel equipped with a stirrer, a thermometer, a condenser and a nitrogen gas inlet, added were the resin solution (i) (500 parts by mass) and the mineral spirit (50 parts by mass), and the reaction mixture was kept at 115° C. Then, a mixture beforehand prepared of styrene (30 parts by mass), methyl methacrylate (150 parts by mass), acrylonitrile (20 parts by mass), and benzoyl peroxide (5 parts by mass) was uniformly dropped into the reaction mixture of the resin solution (i) and the mineral spirit over 3 hrs, being kept at 115° C. under a nitrogen atmosphere.

After that, the mineral spirit (260 parts by mass) was further added, thereby providing a modifies alkyd resin A having a solid content of 50 mass %, a turbid pale brown color and a viscosity of 53 P (poise). The rate of the dispersion stabilizer to the dispersion particles in the modified alkyd resin A was 59/41 in the solid content mass ratio.

(b) Synthesis of Modified Alkyd Resin B

To a reaction vessel equipped with a stirrer, a thermometer, a condenser and a nitrogen gas inlet, added were the resin solution (ii) (600 parts by mass) and the mineral spirit (20 parts by mass), and the reaction mixture was kept at 115° C. Then, a mixture beforehand prepared of styrene (50 parts by mass), methyl methacrylate (120 parts by mass), ethyl acrylate (40 parts by mass), acrylonitrile (30 parts by mass), and benzoyl peroxide (5 parts by mass) was uniformly dropped into the reaction mixture of the resin solution (ii) and the mineral spirit over 3 hrs, being kept at 115° C. under a nitrogen atmosphere.

After that, benzoyl peroxide (5 parts by mass) was further added and the mixture was kept at 115° C. for 1 hr. Then, the mineral spirit (230 parts by mass) was further added, thereby providing a modified alkyd resin B having a solid content of 50 mass %, a turbid pale yellow color and a viscosity of 48 P (poise). The rate of the dispersion stabilizer to the dispersion particles in the modified alkyd resin B was 55/45 in the solid content mass ratio.

(3) Preparation of Coating Composition

A pigment, a matting agent, an additive, and a solvent were added to the obtained modified alkyd resins A and B, respectively, whereby the coating compositions listed in Table 1 were obtained. The viscosity of each coating composition thus obtained was adjusted so that the flow time became 20 sec at 20° C. by Ford cup No. 4. Here, the respective components used in the experiments were listed as follows.

Barium Sulfate: trade name "precipitated barium sulfate", Kawazu Sangyo Co., Ltd.

Calcium Carbonate: trade name "Homocar-D", SHIRAISHI KOGYO KAISYA, LTD.

Carbon Black: trade name "Fjallraven 14 Powder", Columbian Carbon Japan, Ltd.

Polyethylene Wax: trade name "LIOFLAT WE-9210", TOYOCOLOR CO., LTD.

Sedimentation-preventing Agent: trade name "DISPARLON 4200-20", Kusumoto Chemicals, Ltd.

Mineral Spirit: trade name "Mineral Spirit A", JX Nippon Oil & Energy Co.

Xylene: trade name "Xylene", Idemitsu Kosan Co., Ltd.

TABLE 1

| | Agent | Component | Example 1 | Example 2 | Example 3 | Comparative Example 1 | Comparative Example 2 |
|---|---|---|---|---|---|---|---|
| Composition (mass %) | Pigment | Barium Sulfate | 15 | 15 | 15 | 15 | 15 |
| | | Calcium Carbonate | 8 | 8 | 8 | 8 | 8 |
| | | Carbon Black | 4 | 4 | 4 | 4 | 4 |
| | Resin | Modified Alkyd Resin A | 15 | 15.5 | — | 15 | 16 |
| | | Modified Alkyd Resin B | — | — | 15.5 | — | — |
| | Matting Agent | Silica | 2 | 1.5 | 1.5 | — | — |
| | | Polyethylene Wax | — | — | — | 10 | — |
| | Additive | Sedimentation Preventing Agent | 1 | 1 | 1 | 1 | 1 |
| | Solvent | Mineral Spirit | 35 | 35 | 35 | 30 | 36 |
| | | Xylene | 20 | 20 | 20 | 17 | 20 |
| | | Total | 100 | 100 | 100 | 100 | 100 |

(4) Preparation of Coating Composition for Spray-can

Coating compositions for spray-cans were prepared by using the respective coating compositions listed in Table 1 and dimethyl ether (DME) added thereto as a propellant. The coating compositions were filled in the spray-cans, respectively. Here, the composition rate of the coating composition to the propellant was: Coating Composition/Propellant=45.0/55.0 (vol %). A pressure inside the spray-can was adjusted at 0.44 Mpa (25° C.).

Evaluation Method

1. Glossiness (Luster)

A tin plate having a longitudinal length of 70 mm, a width of 150 mm, a thickness of 0.3 mm (NIHON TACT CO., LTD.; SPTE plate) was prepared. A surface of the tin plate was coated by using a spray-can filled with the coating composition for spray-can to form a coating. At that time, the coating process was performed so that a coating thickness after drying was adjusted to be 25 μm.

The glossiness (or luster) of the coating over the tin plate was evaluated by 600 mirror surface glossiness method. Specifically, in accordance with JIS K 5600-4-7, the 600 mirror surface glossiness was measured by a glossimeter (micro-TRI-gloss BYK, incident and reflection angles of 600). A value of the glossiness was calculated by the average data of 3 measurement points on the same tin plate. When the 600 mirror surface glossiness was equal to or less than 20, it was evaluated as "Excellent". When the 600 mirror surface glossiness was more than 20 and equal to or less than 35, it was evaluated as "Good". When the 600 mirror surface glossiness was more than 35, it was evaluated as "Poor".

2. Co-Rotation Prevention

Figure 1B:
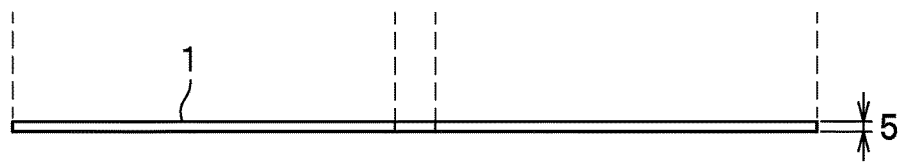
FIG. 1B is a dimensional drawing (i.e., side view) of a steel product used for evaluating the co-rotation prevention.

FIGS. 1A and 1B are dimensional drawings of a steel product used for evaluating co-rotation prevention. Two steel plates 1 each having a longitudinal length of 100 mm, a wide length of 200 mm, and a thickness of 5 mm were prepared. Holes of ϕ13 mm were made on the respective two steel plates at the same center positions.

On the other hand, in order to fix the two steel plates 1 together by a bolt inserted into the holes, provided were a bolt 2 having a regular hexagonal head with a diameter of ϕ21 mm, and a screw part with an outer diameter of ϕ12 mm, a length of 25 mm, a depth of 0.7 mm and a thread pitch of 1.25 mm/rev.; a nut 3 having the corresponding dimensions to the bolt 2; and a flat washer 4.

The respective spray-cans were filled with the coating compositions for spray-can, prepared from the various coating compositions thus produced. Then, the respective one sides of the two steel plates were coated using the respective spray-cans. The coating process was performed so that each coating had a thickness of 15 to 40 μm after drying treatment.

Figure 2:
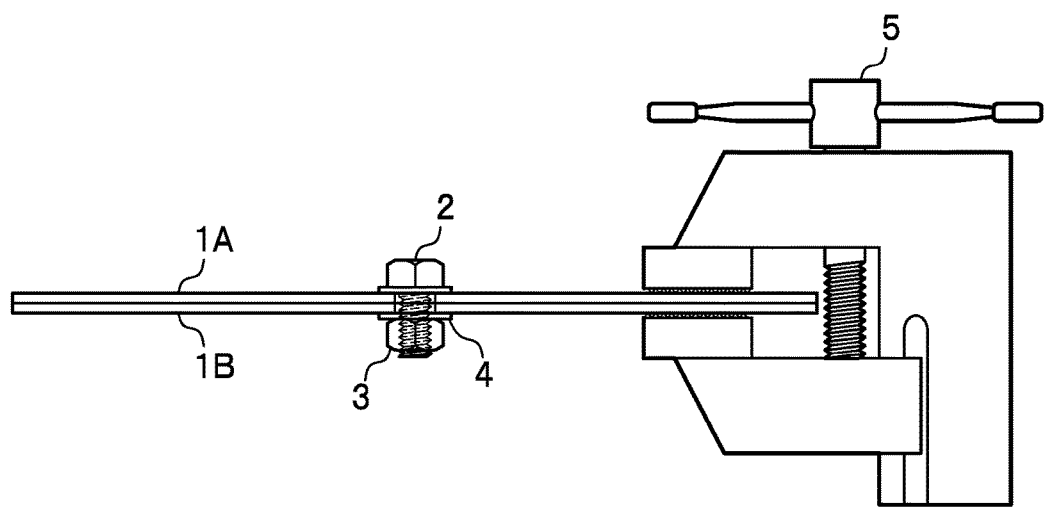
FIG. 2 is a cross-sectional view for explaining a method for evaluating the co-rotation prevention.

FIG. 2 is a cross-sectional view for explaining a method for evaluating co-rotation prevention. Two steel plates 1A and 1B were dowelled together so that the surfaces thus coated were located back to back facing outside. Then, a bolt 2 was inserted into the center holes of the steel plates 1A and 1B, a flat washer 4 was attached, and the dowelled steel plates 1A and 1B were lightly fastened by a nut 3. Then, one end of the dowelled two steel plates 1A and 1B was fixed as clamped by a vise 5. After that, the bolt 2 was tightly fastened by a torque wrench.

When the bolt 2 was fastened by a torque wrench, if the co-rotation did not occur and the torque abruptly rose to achieve sufficiently tight fastening with a torque equal to more than 40 Nm, the co-rotation prevention was evaluated as Excellent (E). Although the co-rotation occurred within 90°, if the torque abruptly rose after the co-rotation had occurred hereby achieving sufficiently tight fastening with a torque equal to more than 40 Nm, the co-rotation prevention was evaluated as Good (G).

However, if the co-rotation occurred thereby failing to achieve the sufficiently tight fastening within the 90° rotation but the torque gradually rose to finally achieve the sufficiently tight fastening, the co-rotation prevention was evaluated as Inferior (I). If the co-rotation occurred to generate continuous co-rotation failing to achieve the sufficiently tight fastening, the co-rotation prevention was evaluated as Poor (P). Three sets of the steel plate were used for evaluating the co-rotation prevention.

The evaluation results of the glossiness and the co-rotation prevention in Examples and Comparative Examples were listed in Table 2.

TABLE 2

| | Evaluated Item | Evaluation Method | Example 1 | Example 2 | Example 3 | Comparative Example 1 | Comparative Example 2 |
|---|---|---|---|---|---|---|---|
| Property | Glossiness | 60° Mirror Surface Glossiness | 20 | 30 | 30 | 25 | 80 |
| | Co-rotation Prevention | Co-rotation Prevention | Excellent | Excellent | Excellent | Inferior to Poor | Excellent |

As elucidated in Table 2, Examples 1 to 3 meet the constitutions of the present invention, providing excellent properties of both glossiness and co-rotation prevention. On the contrary, Comparative Example 1 was experimentally produced the same as Example 1 except that polyethylene wax was used instead of silica. Comparative Example 1 had excellent glossiness but co-rotation prevention thereof was inferior to poor. Comparative Example 2 was experimentally produced the same as Example 1 except that no silica was added. Comparative Example 2 had excellent co-rotation prevention but glossiness thereof was poor.

DESCRIPTION OF REFERENCE NUMBERS 1 (1A, 1B): Steel Plate for Evaluating Co-rotation Prevention
2: Bolt
3: Nut
4: Flat Washer
5: Vise

What is claimed is:

1. An aerosol coating composition comprising a modified alkyd resin, inorganic microparticles and an organic solvent, wherein the modified alkyd resin includes the organic solvent, a dispersion stabilizer made of a vinyl based polymer soluble in the organic solvent at 20° C. when the dispersion stabilizer has a solid content of 50 mass % and has a viscosity of 300 P or less and an alkyd resin soluble in the organic solvent, or a dispersion stabilizer made of said alkyd resin alone; and dispersion particles made of a vinyl based polymer insoluble in the organic solvent at 20° C. when the vinyl based polymer has a solid content of 50 mass % and a viscosity of 300 P or more;

the inorganic microparticles are made of at least one selected from silica, titanium oxide, zinc oxide, alumina, calcium carbonate, talc and clay;

the inorganic microparticles have a mean particle diameter ranging from 1.0 μm to 10.0 μm; and the inorganic microparticles have a content ranging from 0.1 mass % to 5 mass %.

2. The aerosol coating composition of claim 1, wherein the alkyd resin is prepared by esterifying at least one selected from a drying oil, a semi-drying oil, a drying fatty acid and a semi-drying fatty acid with a polyalcohol in the presence of a polybasic acid.

3. The aerosol coating composition of claim 1, wherein the inorganic microparticles are made of silica.

4. The aerosol coating composition of claim 1, further containing a propellant.

5. A metallic mechanical part coated with an aerosol coating composition, the aerosol coating composition comprising a modified alkyd resin, inorganic microparticles and an organic solvent, wherein the modified alkyd resin includes the organic solvent, a dispersion stabilizer made of a vinyl based polymer soluble in the organic solvent at 20° C. when the dispersion stabilizer has a solid content of 50 mass % and has a viscosity of 300 P or less and an alkyd resin soluble in the organic solvent or a dispersion stabilizer made of said alkyd resin alone; and dispersion particles made of a vinyl based polymer insoluble in the organic solvent at 20° C. when the vinyl-based polymer has a solid content of 50 mass % and has a viscosity of 300 P or more;

the inorganic microparticles are made of one selected from silica, titanium oxide, zinc oxide, alumina, calcium carbonate, talc and clay;

the inorganic microparticles have a mean particle diameter ranging from 1.0 μm to 10.0 μm; and the inorganic microparticles have a content ranging from 0.1 mass % to 5 mass %.

6. The aerosol coating composition of claim 2, further containing a propellant.

7. The metallic mechanical part of claim 5, wherein the alkyd resin is prepared by esterifying at least one selected from a drying oil, a semi-drying oil, a drying fatty acid and a semi-drying fatty acid with a polyalcohol in the presence of a polybasic acid.

* * * * *